United States Patent [19]

Ohsawa et al.

[11] Patent Number: 5,546,372
[45] Date of Patent: Aug. 13, 1996

[54] INFORMATION DETECTION LIGHT INTENSITY CONTROL APPARATUS IN OPTICAL DISC RECORDED-INFORMATION REPRODUCING APPARATUS

[75] Inventors: Seiichi Ohsawa; Takuma Yanagisawa, both of Tsurugashima, Japan

[73] Assignee: Pioneer Electronic Corporation, Tokyo, Japan

[21] Appl. No.: 255,173

[22] Filed: Jun. 7, 1994

[30] Foreign Application Priority Data

Jun. 8, 1993 [JP] Japan .................................. 5-137664

[51] Int. Cl.$^6$ .......................................... G11B 7/00
[52] U.S. Cl. .................................. 369/116; 369/58
[58] Field of Search ........................ 369/116, 58, 54, 369/124, 47, 50, 100

[56] References Cited

U.S. PATENT DOCUMENTS

| | | | |
|---|---|---|---|
| 4,051,329 | 9/1977 | Blondet et al. | 369/116 |
| 4,937,799 | 6/1990 | Hashimoto et al. | 369/116 |
| 5,216,660 | 6/1993 | Iimura | 369/54 |

Primary Examiner—Georgia Y. Epps
Assistant Examiner—P. W. Huber
Attorney, Agent, or Firm—Perman & Green

[57] ABSTRACT

An information detection light intensity control apparatus in an apparatus reproducing information recorded in an optical disc in which a reflectance has a dependency on an incident light intensity, comprising a light source for emitting an information detection light which enters the optical disc and a control system for controlling an intensity of the information detection light which enters the optical disc so that a ratio of an intensity of the information detection light which enters the optical disc and an intensity of the information detection light reflected from the optical disc is set to a predetermined value. According to the information detection light intensity control apparatus, a spot head value of the information detection light is held to the optimum value by coping with an aberration of a fluctuation such as disc tilt, disc thickness variation, or the like or with a sensitivity fluctuation of a super resolution film so that the information recorded in the super resolution optical disc can be stably reproduced.

8 Claims, 5 Drawing Sheets

INFORMATION DETECTION LIGHT INTENSITY CONTROL APPARATUS IN OPTICAL DISC RECORDED-INFORMATION REPRODUCING APPARATUS

BACKGROUND OF THE INVENTION

1. Field of the Invention

The present invention relates to an optical disc recorded-information reproducing apparatus and, more particularly, to an information detection light intensity control apparatus to control an intensity of an information detection light (rays of light incident upon an optical disc) which should enter an optical disc.

2. Description of the Related Arts

In an optical disc recorded-information reproducing apparatus to reproduce a signal recorded in a compact disc or a video disc in which pits corresponding to information signals to be recorded were recorded onto the surface of a disk-shaped recording medium, a laser beam is converged onto the pit or non-pit and an increase or decrease of a reflection light intensity is detected, and the signal recorded therein is read. In an information detection optical system of the optical disc recorded-information reproducing apparatus, there is a limit of a cut-off spatial frequency $2NA/\lambda$ (NA denotes a numerical aperture of an objective lens and $\lambda$ indicates a wavelength of the laser beam). In order to raise dencity of a recording film surface by increasing a spatial resolution, it is necessary to increase the numerical aperture of the objective lens and to shorten the wavelength of the laser beam.

As an example of an optical disc recorded-information reproducing apparatus for raising the spatial resolution, an apparatus which uses an apodization or a super resolution has been proposed in Japanese Patent Kokai No.2-12625. In an irradiation optical system of such a disc recorded-information reproducing apparatus, a light intensity of circumference of the center of an incident pupil of a laser beam for reading is reduced by a shielding plate, a pattern spot is formed on the optical disc surface, and a main lobe in which a diameter of the spot is small is used.

In consideration of an intensity distribution of the laser beam which enters such an optical disc, in order to obtain a smaller and more effective diffraction image spot, an optical disc having a reflection film using a phase change material such as SbSe or the like in which a reflectance rises in association with an increase in temperature, that is, which indicates a reflectance temperature dependency, has been proposed in Japanese Patent Kokai No.3-292632. According to such an optical disc, since the reflectance in a beam spot for detecting information of the optical disc can be changed partially, an effective spot diameter of the beam spot for detection of information on the optical disc can be reduced. A spatial frequency which is equal to or higher than the cut-off spatial frequency of an information detection optical system can be therefore reproduced.

In what are called super resolution reproducing systems as mentioned above, disc recorded-information is read out by an information detecting system as shown in FIG. 1.

In FIG. 1, an emission light generated from a semiconductor laser 11 enters an optical disc 14 as an information detection light through a beam splitter 12 and an objective lens 13. The information detection light which entered the optical disc 14 is reflected by an information recording surface of the optical disc 14 and reaches the beam splitter 12 again via the objective lens 13. Such a reflection light from the optical disc 14 passes in the beam splitter 12 and is led to a photodetector 15. The photodetector 15 generates an electric signal in accordance with a light reception amount. The electric signal is supplied to a signal reproducing system (not shown).

A power monitor output terminal for outputting a signal indicative of an intensity of the emission light is extended from the semiconductor laser 11. A signal which is output from the output terminal, that is, an emission light intensity signal is supplied to one of input terminals of a comparing circuit 16 comprising, for example, an operational amplifier. A reference voltage $V_{ref}$ from a reference voltage generating circuit 17 is supplied to the other input terminal of the comparing circuit 16. The comparing circuit 16 compares the level of the emission light intensity signal with the level of the reference voltage $V_{ref}$ and supplies a signal according to the level difference between them to a driving circuit 18. The driving circuit 18 supplies a laser driving signal having a format to be supplied to the semiconductor laser 11 in accordance with the supplied signal thereto.

In the information detecting system, the semiconductor laser 11 is driven and controlled so that its emission light intensity is constantly set to a predetermined emission light intensity indicated by a preset reference voltage $V_{ref}$.

In a system for reading information recorded on a disc in which an information recording surface is formed by a super resolution film having characteristics such that a reflectance changes according to a light irradiation as in foregoing Japanese Patent Kokai No.3-292632, a threshold value of the super resolution film is set to a predetermined light intensity of an information detection light which is generated by the semiconductor laser 11. The above point will now be explained on the basis of FIG. 2. FIG. 2 is a diagram showing an intensity distribution on the disc of an information detection light. An axis of abscissa (r) indicates a distance from the center of the information detection light. An axis of ordinate (I) indicates a light intensity level. A characteristics curve $i_0$ drawn by a solid line indicates an intensity distribution of the information detection light in case of no aberration in the disc. From the diagram, it will be understood that the center of the information detection light indicates the maximum intensity. The value ($I_{th}$) which is about 80% of such a maximum intensity value of the spot center of the information detection light is set to a threshold value of characteristics (irradiation light intensity I-reflectance R characteristics) of a reflection film of the super resolution optical disc as shown in FIG. 3. As will be understood from FIG. 3, the reflectance of the super resolution film has characteristics such that the reflectance rises by setting the threshold value $I_{th}$ as a border.

Therefore, when the information recorded in the super resolution optical disc in which the threshold value has been set as mentioned above is detected, an intensity portion which is larger than the threshold value $I_{th}$ is an effective spot for an information detection in the information detection light generated by the semiconductor laser 11.

In case of the information detection of the super resolution optical disc is executed in such an information detection system as shown in FIG. 1, however, when there is an aberration of a fluctuation such as disc tilt, disc thickness variation, or the like or a sensitivity fluctuation of the super resolution film, a spot head value of the information detection light is deviated from the optimum value, so that there is an occurrence of problem such that the information reproduction of the super resolution optical disc is unstable.

For example, in FIG. 2, a characteristics curve $i_1$ drawn by a coarse broken line indicates an intensity distribution of the information detection light on the disc when a coma aberration in the track direction (tangential direction) on the disc is equal to 0.035 λRMS (λ denotes a wavelength of the information detection light and RMS indicates Root Mean Square). A characteristics curve $i_2$ drawn by a fine broken line indicates an intensity distribution of the information detection light on the disc when the coma aberration in the track direction (tangential direction) is equal to 0.07 λRMS. As the aberration increases, a peak power of the information detection light on the disc decreases by about 20% and there is a possibility such that the peak power is smaller than the threshold value $I_{th}$ in the worst case. In such an information reproduction of the super resolution optical disc, when the peak power level and the threshold value are close, a very unstable state such that the recorded-information light which should be reflected from the disc is not reflected is caused, so that it is a big problem.

OBJECTS AND SUMMARY OF THE INVENTION

The present invention is made in consideration of the problems as mentioned above. It is an object of the invention to provide an information detection light intensity control apparatus in an optical disc recorded-information reproducing apparatus in which a spot head value of an information detection light is held to the optimum value by coping with an aberration of a fluctuation such as disc tilt, disc thickness variation, or the like or with a sensitivity fluctuation of a super resolution film and the information of the super resolution optical disc can be stably reproduced.

According to the present invention, there is provided an information detection light intensity control apparatus in a recorded-information reproducing apparatus of an optical disc in which a reflectance has a dependency on an incident light intensity, wherein the control apparatus has a light source to emit an information detection light which enters the optical disc and control means for controlling an intensity of the information detection light which enters the optical disc so that a ratio of an intensity of the information detection light which enters the optical disc and an intensity of the information detection light reflected from the optical disc is set to a predetermined value.

The information detection light intensity control apparatus in the optical disc recorded-information reproducing apparatus of the present invention controls the intensity of the information detection light which enters the optical disc so that the ratio of the intensity of the information detection light which enters the optical disc and the intensity reflected from the optical disc is set to a predetermined value.

DETAILED DESCRIPTION OF THE EMBODIMENTS

The present invention will now be explained in detail hereinbelow with reference to the drawings.

Figure 1:
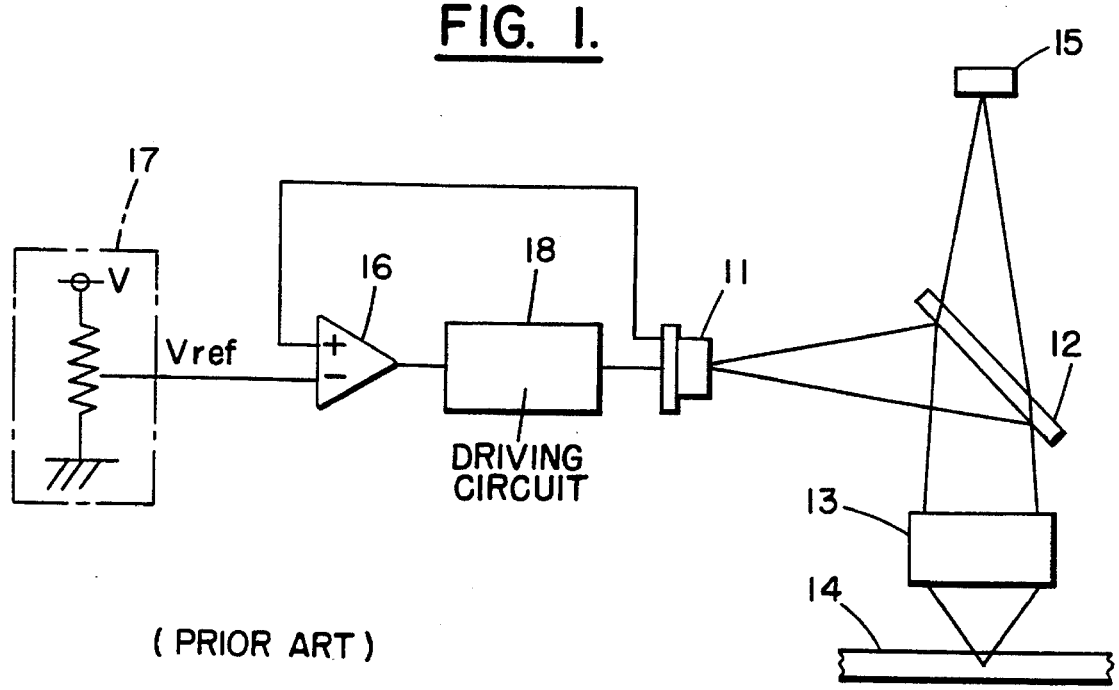
FIG. 1 is a block diagram showing an information detection system in a conventional optical disc recorded-information reproducing apparatus.
Figure 4:
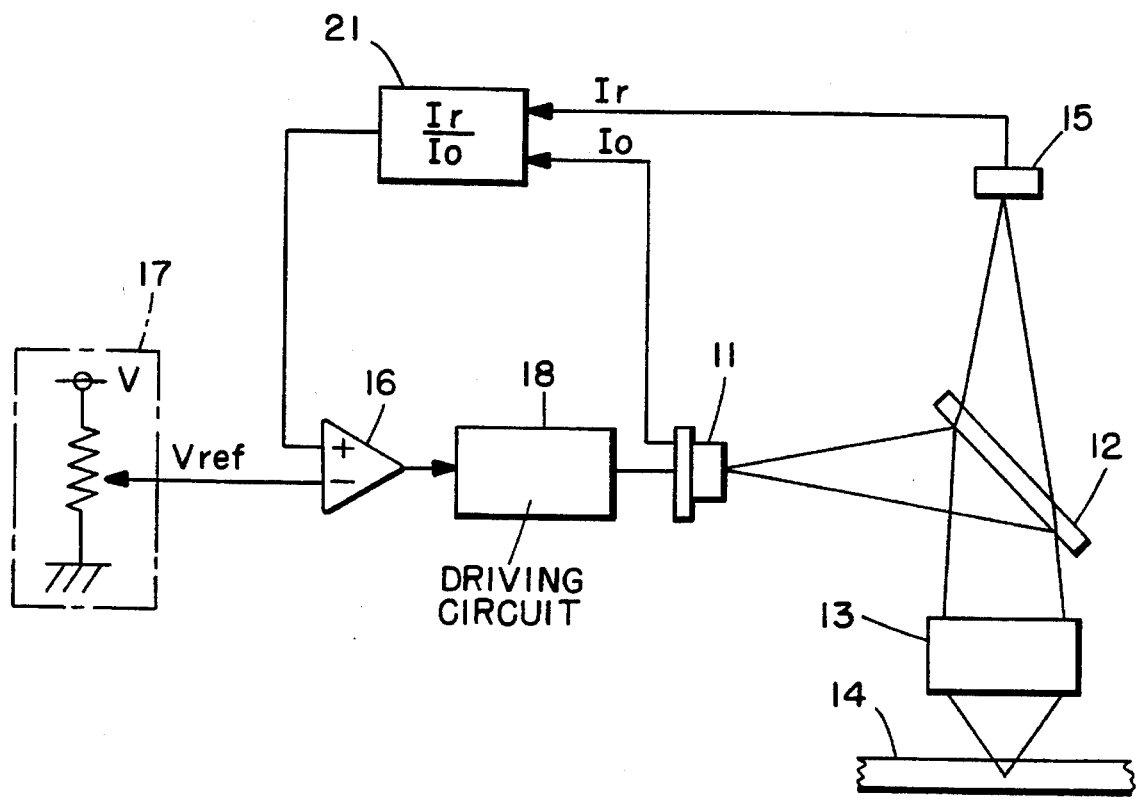
FIG. 4 is a block diagram showing an information detection system in an optical disc recorded-information reproducing apparatus of an embodiment according to the present invention.

FIG. 4 is a diagram showing a construction of an information detection system in an optical disc recorded-information reproducing apparatus of an embodiment according to the invention. In the diagram, portions having functions similar to those in FIG. 1 are designated by the same reference numerals.

In FIG. 4, the photodetector 15 receives the reflection light of the information detection light from the super resolution optical disc 14 and generates a signal at a level according to the light reception amount. The signal generated from the photodetector 15 is supplied as a reflection light amount detection signal to one input terminal of a divider 21 comprising, for example, an operational amplifier. An emission light intensity signal from the semiconductor laser 11 is supplied to another input terminal of the divider 21. The divider 21 executes a dividing process to an level $I_r$ of the reflection light amount detection signal and a level $I_o$ of the emission light intensity signal, and generates a signal at the level corresponding to the value of $I_r/I_o$. A division output signal of the divider 21 is supplied to one input terminal of a comparing circuit 16 and the level of the division output signal is compared with the level of a preset reference voltage $V_{ref}$.

Figure 5:
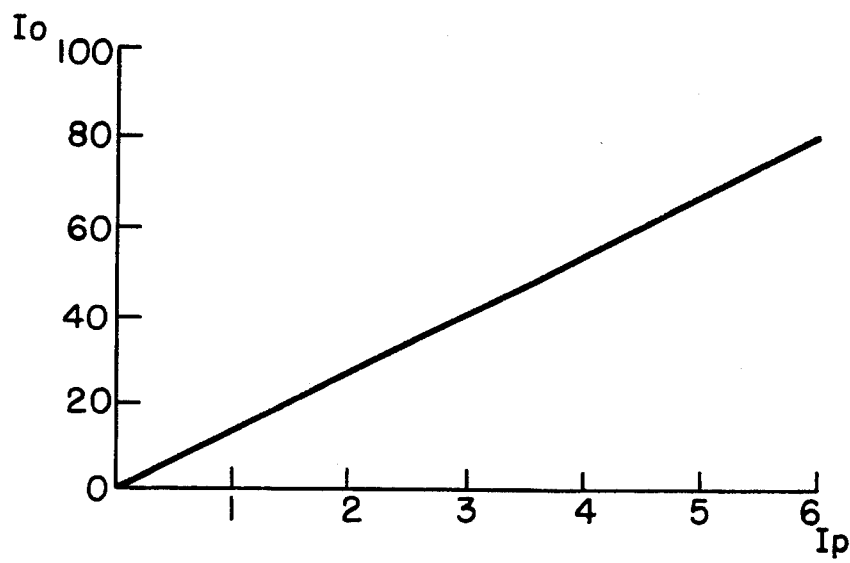
FIG. 5 is a graph showing characteristics of a spot center intensity of the information detection light and a total amount of incident light on an optical disc for explaining the operation of FIG. 4.
Figure 6:
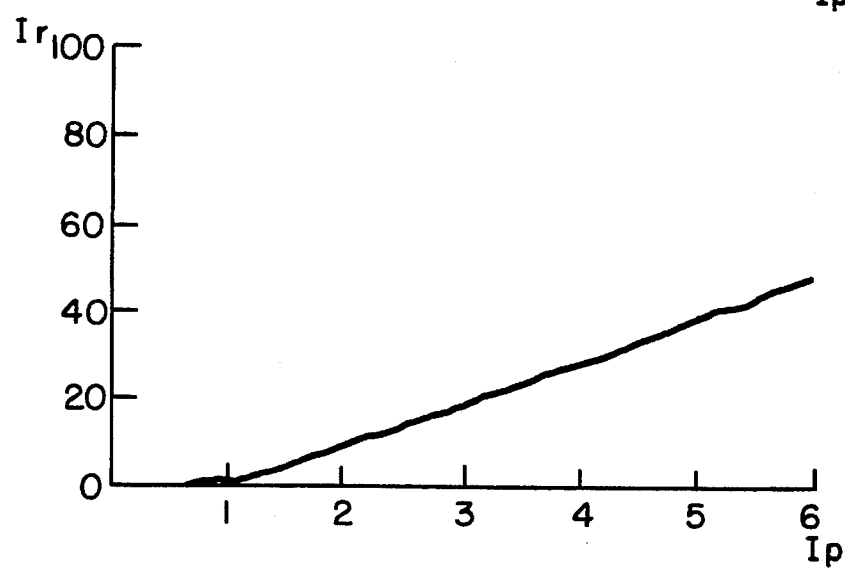
FIG. 6 is a graph showing characteristics of a spot center intensity of the information detection light and a total amount of reflection light from an optical disc for explaining the operation of FIG. 4.
Figure 7:
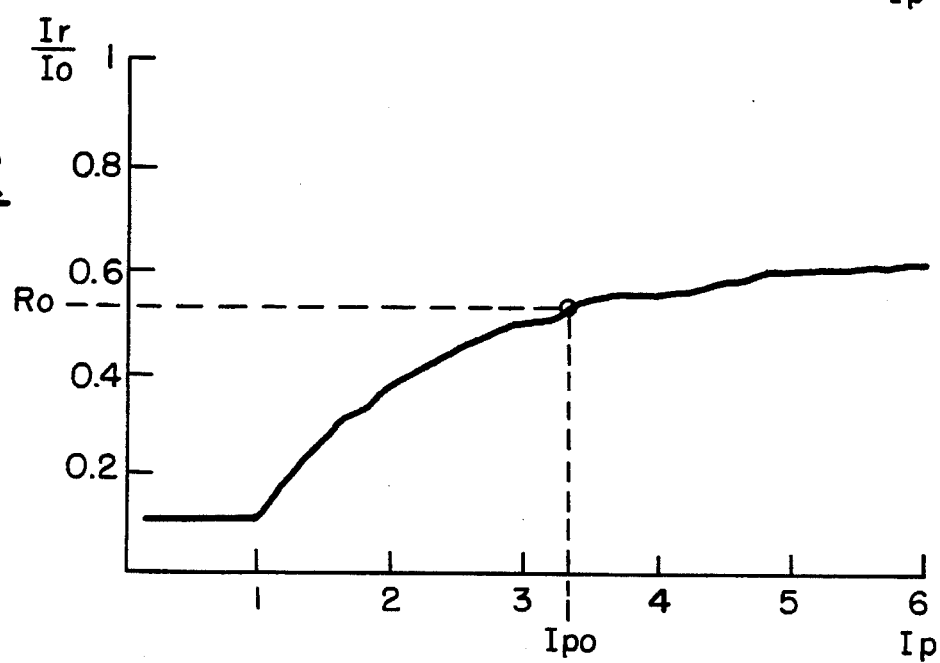
FIG. 7 is a graph showing characteristics of a spot center intensity of the information detection light and a reflectance of a super resolution reflecting film for explaining the operation of FIG. 4.

The total incident light amount to the optical disc 14 confronting with a spot center intensity $I_p$ of the information detection light generated by the semiconductor laser 11, that is, characteristics of the level $I_o$ of the emission light intensity signal are as shown in FIG. 5. The total reflection light amount from the optical disc 14 confronting with the spot center intensity $I_p$ of the information detection light, that is, characteristics of the level $I_r$ of the reflection light amount detection signal are as shown in FIG. 6. Characteristics of the reflectance $I_r/I_o$ of the optical disc 14 confronting with the spot center intensity $I_p$ of the information detection light are as shown in FIG. 7. In FIGS. 5 and 6, the spot center intensity $I_p$ is illustrated by the value which was standardized by the foregoing threshold value $I_{th}$.

Figure 2:
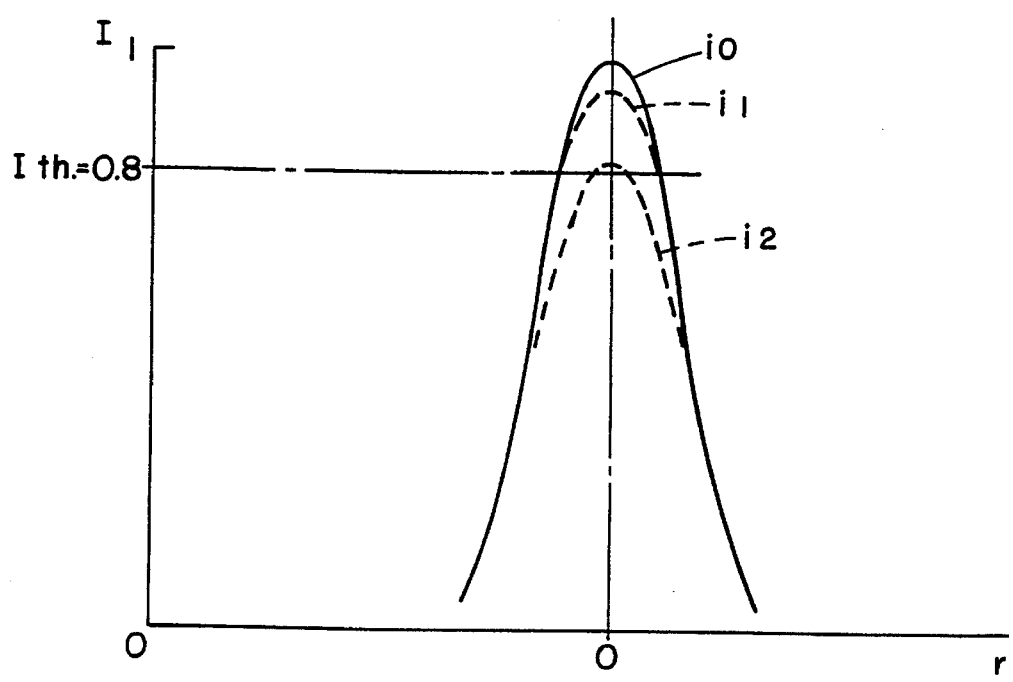
FIG. 2 is a graph showing an intensity distribution of an information detection light for explaining problems in the information detection system of FIG. 1.
Figure 3:
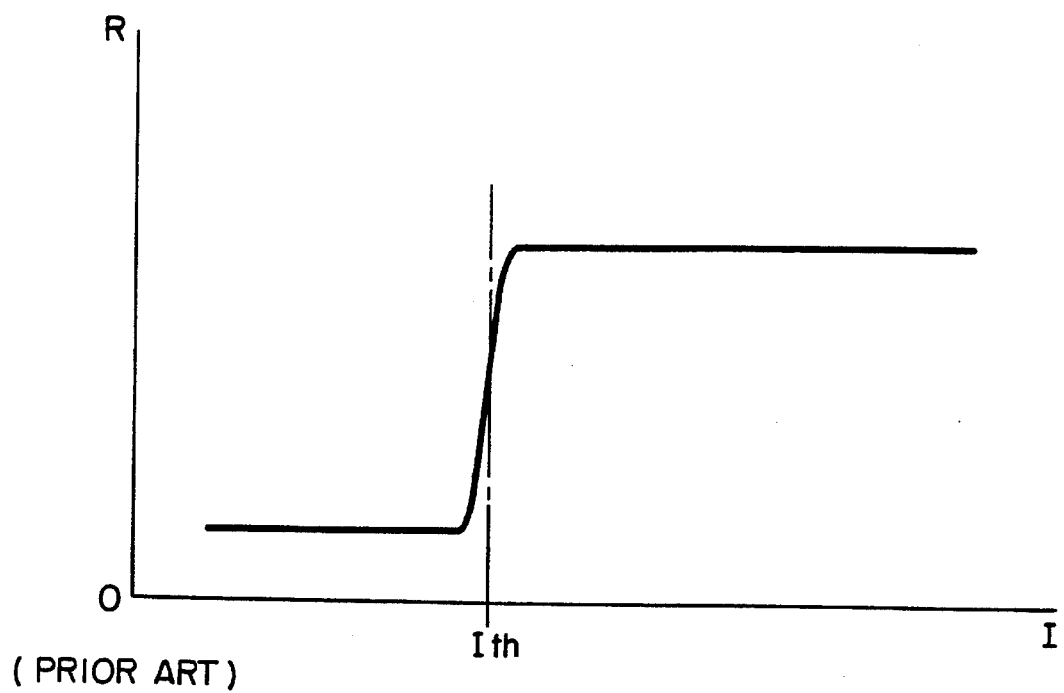
FIG. 3 is a graph showing characteristics between an irradiation light intensity and a reflectance of a reflecting film of a super resolution optical disc for explaining the problems in the information detection system of FIG. 1.

In the embodiment, the reference voltage $V_{ref}'$ corresponding to a predetermined reflectance $R_0$ in the characteristics diagram of FIG. 7 is supplied to the comparing circuit 16 and the level of the reference voltage $V_{ref}'$ is compared with the level of the division output signal of the divider 21, that is, the level of the reflectance of the super resolution film of the disc to which the information detection light irradiates. The semiconductor laser 11 is driven by a signal according to the difference between those levels so that the reflectance is set to a predetermined reflectance $R_0$. Even when the spot head value of the information detection light fluctuates on the optical disc and its reflection light amount fluctuates, therefore, the spot center intensity of the information detection light which is generated from the semiconductor laser 11 is controlled so as to be constant at $I_{po}$. Therefore, as for the intensity distribution of the information detection light on the disc 14, the spot head value of the information detection light can be maintained to the optimum value as shown in a curve $i_0$ in FIG. 2, even an aberration of a fluctuation such as disc tilt, disc thickness variation, or the like or a sensitivity fluctuation of the super resolution film occurs.

Figure 8:
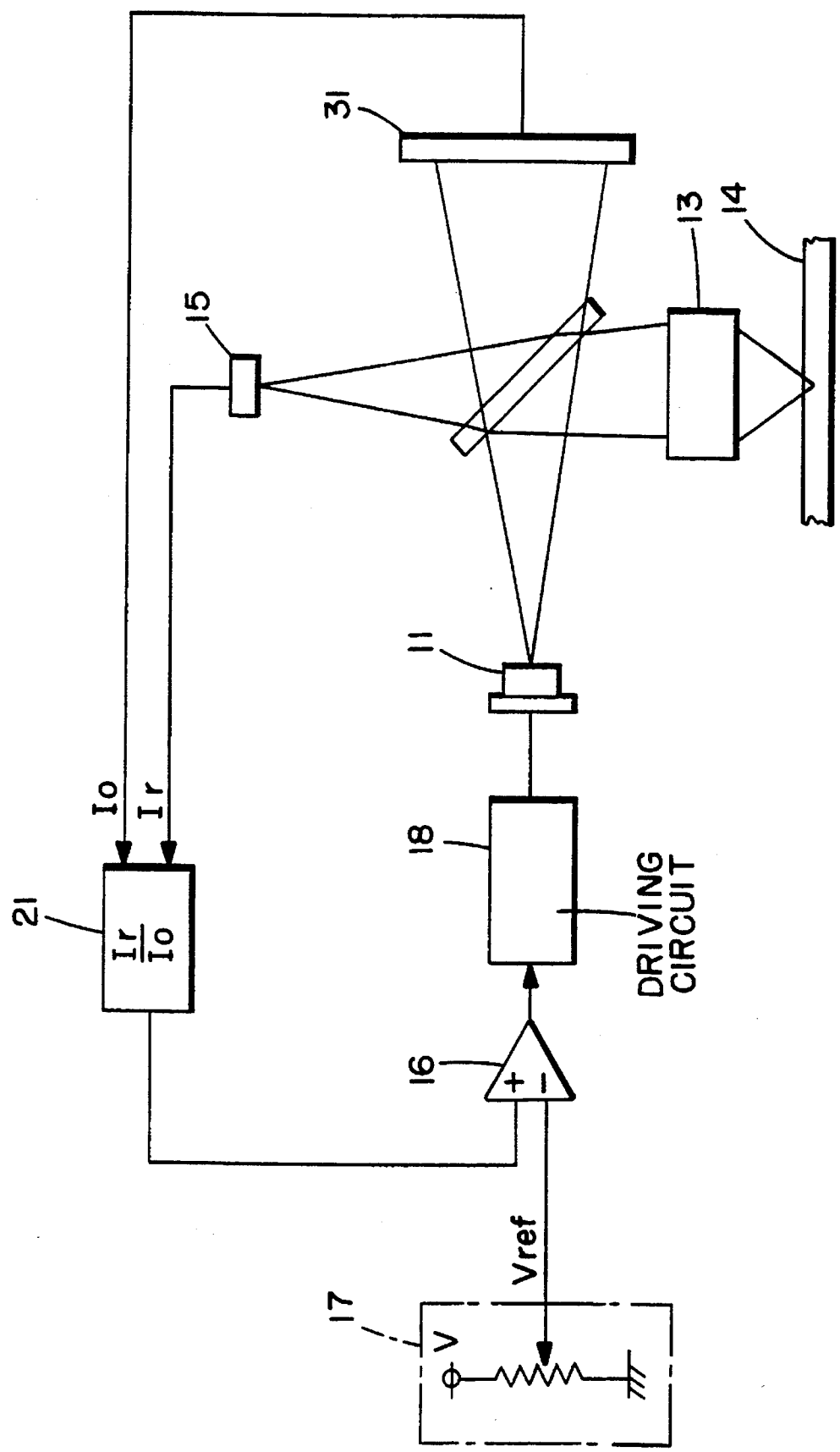
FIG. 8 is a block diagram showing an information detection system in an optical disc recorded-information reproducing apparatus of another embodiment according to the present invention.

FIG. 8 is a diagram showing a construction of an information detection system in an optical disc recorded-information reproducing apparatus of another embodiment according to the invention. Portions having similar functions as those in FIGS. 1 and 4 are designated by the same reference numerals.

In FIG. 8, in order to obtain a signal indicative of an emission light intensity of the semiconductor laser 11, a photodetector 31 to receive an emission light of the semiconductor laser 11 through the beam splitter 12 is provided. The photodetector 31 supplies a signal at a level according to the light reception amount as an emission light intensity signal to one input terminal of the divider 21. The divider 21 executes a dividing process to the level $I_r$ of the reflection light amount detection signal from the photodetector 15 and the level $I_o$ of the emission light intensity signal from the photodetector 31 and generates a signal at a level corresponding to the value of $I_r/I_o$. The division output signal of the divider 21 is supplied to another input terminal of the comparing circuit 16 and the level of the division output signal is compared with the level of the reference voltage $V_{ref}'$.

In the information detection system as well, the semiconductor laser 11 is driven so that a reflectance is set to the predetermined reflectance $R_0$ in a manner similar to the foregoing embodiment. Even when the spot head value of the information detection light fluctuates on the optical disc and its reflection light amount fluctuates, the spot center intensity of the information detection light which is generated from the semiconductor laser 11 is controlled so that the spot center intensity is set to the constant value $I_{po}$.

Figure 9:
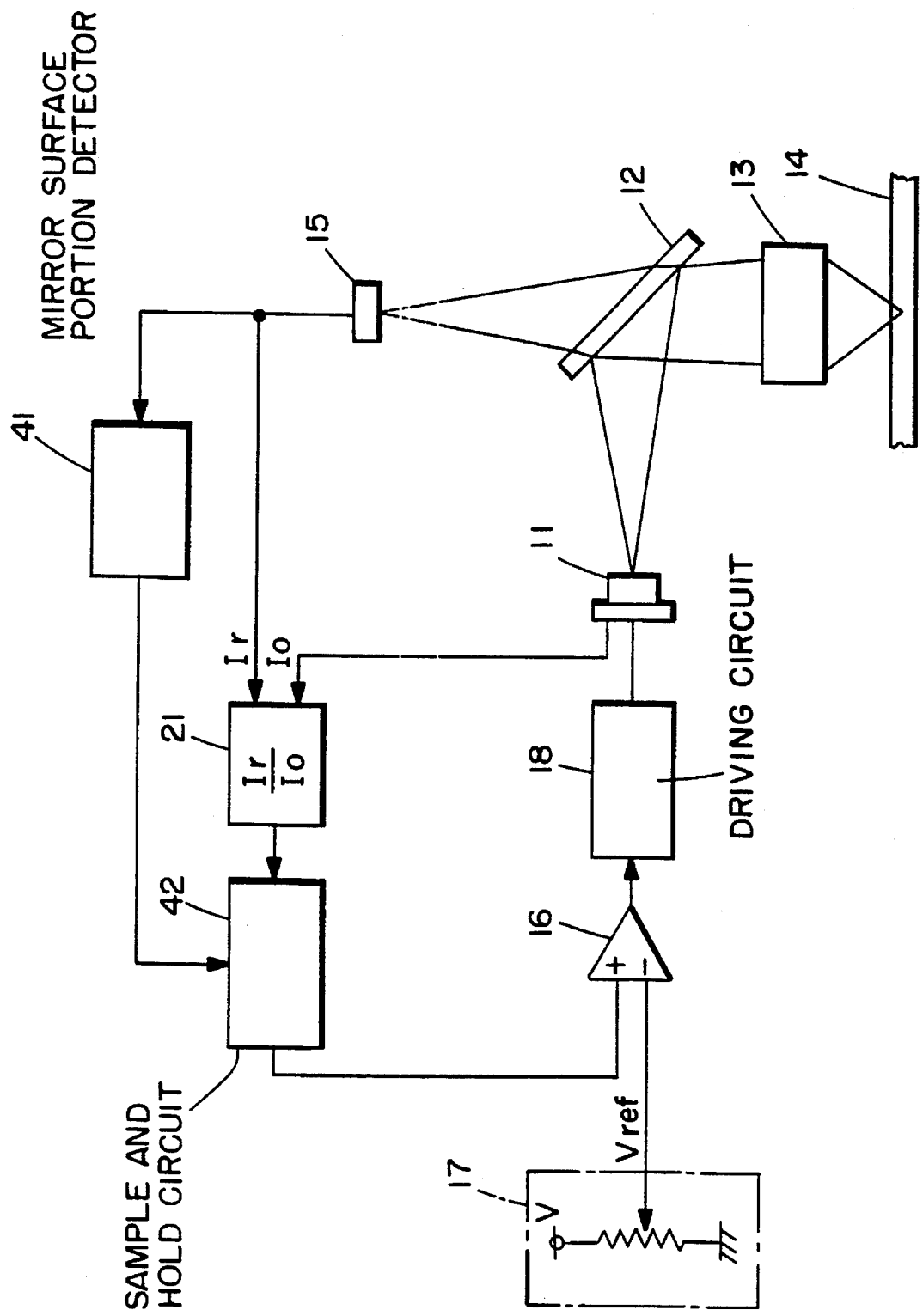
FIG. 9 is a block diagram showing an information detection system in an optical disc recorded-information reproducing apparatus of further another embodiment according to the present invention.

FIG. 9 is a diagram showing a construction of an information detection system in an optical disc recorded-information reproducing apparatus of further another embodiment of the invention. Portions having similar functions as those in FIGS. 1, 4, and 8 are designated by the same reference numerals.

In FIG. 9, a signal generated from the photodetector 15 is supplied to one input terminal of the divider 21 as a reflection light amount detection signal and is also supplied to a mirror surface portion detector 41. On the basis of the reflection light amount detection signal, the mirror surface portion detector 41 detects whether the information detection light exists in the mirrored surface portion (mirror-finished portion) of the optical disc 14 or not. Such a mirror surface portion detector 41 is constructed by, for example, a peak detector as disclosed techniques in Japanese Patent Kokai No.55-117743 or Japanese Utility Model Kokai No.63-13414 (Japanese Utility Model Application No. 61-107331), and the like and detects that the information detection light is located at a position other than the pit portion on the recording surface of the disc 14. When the mirror surface portion detector 41 detects that the information detection light spot exists in the mirror surface portion, the detector 41 sends a mirror surface portion detection signal to a sample and hold circuit 42. The emission light intensity signal from the semiconductor laser 11 is supplied to another input terminal of the divider 21 in a manner similar to FIG. 4. The divider 21 executes a dividing process of the level $I_r$ of the reflection light amount detection signal and the level $I_o$ of the emission light intensity signal and generates a signal at a level corresponding to the value of $I_r/I_o$. The division output signal of the divider 21 is supplied to the sample and hold circuit 42. When the mirror surface portion detection signal is generated from the mirror surface portion detector 41, the sample and hold circuit 42 holds and supplies the division output signal level at the time point of the generation of the mirror surface portion detection signal to another input terminal of the comparing circuit 16. The comparing circuit 16 compares the level of the holding output signal of the sample and hold circuit 42 and the level of the preset reference voltage $V_{ref}'$.

In the information detection system, the semiconductor laser 11 is driven and controlled so that the ratio of the emission light intensity and the reflection light intensity when the information detection light spot exists in the mirror surface portion of the optical disc 14, namely, the reflectance is set to a set value. Due to this, an influence by the fluctuation of the spot head value due to the presence or absence of the pit can be avoided and further stable resolution image can be reproduced in addition to the effects obtained by the foregoing two embodiments.

In the above three embodiments, since the power control loop including the comparing circuit 16 runs away at the time of off-focus of the information detection light, it is actually necessary to start the power control after the focus was turned on. For instance, there are the following methods of judging to monitor the focus-on:

1) whether a return light amount (a reflection light amount from the optical disc 14) exceeds a predetermined value or not;

2) whether the focus servo has been turned on or not;

It is also desirable to set the upper and lower limits of the target value of the power control so as not to cause any problem even if the power control loop runs away.

As described in detail above, according to the information detection light intensity control apparatus in the optical disc recorded-information reproducing apparatus of the invention, since the intensity of the information detection light which enters the optical disc is controlled so that the ratio of the intensity of the information detection light which enters the optical disc and the intensity of the information detection light reflected from the optical disc is equal to the predetermined value, the spot head value of the information detection light is held to the optimum value by coping with an aberration of the fluctuation such as disc tilt, disc thickness variation, or the like or with a sensitivity fluctuation of the super resolution film and the information recorded in the super resolution optical disc can be stably reproduced.

What is claimed is:

1. An information detection light intensity control apparatus in a recorded-information reproducing apparatus of an optical disc in which a reflectance has a dependency on an incident light intensity, comprising:

an optical reading system having a light source for emitting an information detection light which enters said optical disc; and control means for controlling an intensity of the information detection light which enters said optical disc so that a ratio of the intensity of the information detection light which enters said optical disc and an intensity of the information detection light reflected from said optical disc is set to a predetermined value.

2. An apparatus according to claim 1, wherein said light source is a semiconductor laser and said control means includes a divider to which a power monitor output of said semiconductor laser and a reception light output of a photodetector which receives the information detection light reflected from said optical disc are supplied, respectively, and said semiconductor laser is driven and controlled so that a level of a division output signal of said divider is set to a predetermined value.

3. An apparatus according to claim 2, wherein said control means has voltage generating means for generating a reference voltage having a level corresponding to said predetermined value and a comparing circuit to which said division output signal is supplied as one input and said reference voltage is supplied as another input, and said semiconductor laser is driven in accordance with a comparison output signal of said comparing circuit.

4. An apparatus according to claim 1, wherein said light source is a semiconductor laser and said control means includes a first photodetector to receive the information detection light which is emitted from said semiconductor laser, a second photodetector to receive the information detection light reflected from said optical disc, and a divider to which reception light outputs of said first and second photodetectors are supplied, and said semiconductor laser is driven and controlled so that a level of the division output signal of said divider is set to a predetermined value.

5. An apparatus according to claim 4, wherein said control means has voltage generating means for generating a reference voltage having a level corresponding to said predetermined value and a comparing circuit to which said division output signal is supplied as one input and said reference voltage is supplied as another input, and said semiconductor laser is driven in accordance with a comparison output signal of said comparing circuit.

6. An apparatus according to claim 1, wherein said light source is a semiconductor laser and said control means includes:

mirror surface portion detecting means for detecting that the information detection light which enters said optical disc exists in a mirror surface portion of said optical disc;

a photodetector for receiving the information detection light reflected from said optical disc;

a divider to which a reception light output of said photodetector and a power monitor output of said semiconductor laser are supplied, respectively; and a sample and hold circuit for sampling and holding a division output signal of said divider when said mirror surface portion detecting means detects that the information detection light which enters said optical disc exits in the mirror surface portion of said optical disc, and wherein said semiconductor laser is driven and controlled so that a level of an output signal of the sample and hold circuit is equal to a predetermined value.

7. An apparatus according to claim 6, wherein said control means has voltage generating means for generating a reference voltage having a level corresponding to said predetermined value and a comparing circuit to which an output signal of said sample and hold circuit is supplied as one input and said reference voltage is supplied as another input, and said semiconductor laser is driven in accordance with a comparison output signal of said comparing circuit.

8. An apparatus according to claim 1, wherein said optical reading system includes a focussing servo loop and wherein said control means is activated in a state in which a focusing servo of said information detection light is on.

* * * * *